US012742643B2

(12) United States Patent
Gattere et al.

(10) Patent No.: US 12,742,643 B2
(45) Date of Patent: Sep. 22, 2026

(54) CIRCUIT AND METHOD FOR DRIVING A MICRO-ELECTRO-MECHANICAL RESONATOR OF A GYROSCOPE WITH A REDUCED EXCITATION OF SPURIOUS HARMONICS

(71) Applicant: STMICROELECTRONICS S.r.l., Agrate Brianza (IT)

(72) Inventors: Gabriele Gattere, Castronno (IT); Marco Garbarino, Cusago (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 437 days.

(21) Appl. No.: 18/403,324

(22) Filed: Jan. 3, 2024

(65) Prior Publication Data

US 2024/0240945 A1 Jul. 18, 2024

(30) Foreign Application Priority Data

Jan. 12, 2023 (IT) ........................ 102023000000330

(51) Int. Cl.
*G01C 19/5762* (2012.01)
*G01C 19/5755* (2012.01)

(52) U.S. Cl.
CPC ................................ *G01C 19/5755* (2013.01)

(58) Field of Classification Search
CPC ............ G01C 19/5755; G01C 19/5762; G01C 25/005; G01C 19/5776
See application file for complete search history.

(56) References Cited

U.S. PATENT DOCUMENTS

2011/0197674 A1* 8/2011 Prandi ................ G01C 19/5762 73/504.12
2013/0283908 A1 10/2013 Geen et al.
2016/0298963 A1 10/2016 Kapusta et al.
2016/0341758 A1 11/2016 Waters et al.
2017/0167876 A1* 6/2017 Coronato ........... G01C 19/5776
2019/0219394 A1 7/2019 Lin et al.
2021/0270608 A1* 9/2021 Zhou ................... G01C 25/005

* cited by examiner

*Primary Examiner* — Cortez M Cook
(74) *Attorney, Agent, or Firm* — Seed Intellectual Property Law Group LLP

(57) ABSTRACT

A driving circuit is implemented for a driving resonator stage of a MEMS gyroscope including at least a first and a second electrode and a movable mass The driving circuit includes a synchronization stage which receives an electrical position signal indicative of the position of the movable mass and generates a reference signal phase- and frequency-locked with the electrical position signal; a driving stage which generates, on the basis of the reference signal, a first and a second driving signal, which are applied to the first and, respectively, the second electrodes, so that the movable mass is subject to a first and a second electrostatic force which cause the movable mass to oscillate.

20 Claims, 8 Drawing Sheets

CIRCUIT AND METHOD FOR DRIVING A MICRO-ELECTRO-MECHANICAL RESONATOR OF A GYROSCOPE WITH A REDUCED EXCITATION OF SPURIOUS HARMONICS

BACKGROUND

Technical Field

The present disclosure relates to a circuit and a method for driving a micro-electromechanical (MEMS) resonator of a gyroscope with reduced excitation of spurious harmonics.

Description of the Related Art

As is known, MEMS devices are nowadays available which function as gyroscopes, which include at least one movable mass, which is oscillated along a driving direction; in this manner, when the MEMS device rotates around a rotation direction perpendicular to the driving direction, the movement of the movable mass acquires an oscillatory component along a so-called sensing direction, which is perpendicular to the driving direction and the rotation direction. The oscillation of the movable mass along the sensing direction occurs with an amplitude that is proportional to the rotation speed of the MEMS device.

For example, FIG. 1 shows a gyroscope 1, which includes a driving stage 2, which includes a timing stage 3A and a bridge circuit 3B; furthermore, the gyroscope 1 includes a driving resonator stage 4, a sensing resonator stage 6, a first and a second conversion stage 8, 10, an output stage 12, a gain control stage 14 and a phase-locked loop stage 16, hereinafter briefly referred to as the PLL stage 16. Furthermore, the gyroscope 1 includes a first pair of sensing electrodes 5 and a second pair of sensing electrodes 7.

In detail, the driving resonator stage 4 and the sensing resonator stage 6 are formed by an electromechanical system which includes at least one movable mass 20, visible in FIG. 2, which is coupled to a frame 21 through a spring system which may be modeled as including a pair of first springs 22, which are deformable so as to allow the movable mass 20 to oscillate along an X direction, and a pair of second springs 24, which are deformable so as to allow the movable mass 20 to oscillate along a Z direction. As a first approximation, it is therefore possible to model the driving resonator stage 4 as including the movable mass 20 and the first springs 22; similarly, the sensing resonator stage 6 may be modeled as including the movable mass 20 and the second springs 24.

In practice, the driving resonator stage 4 and the sensing resonator stage 6 share the movable mass 20, which may oscillate along the X axis according to a so-called driving mode, which has a corresponding resonance frequency, which is hereinafter referred to as the frequency $f_0$; in practice, if forced to the frequency $f_0$, the movable mass 20 resonates along the X axis. Furthermore, the movable mass 20 may oscillate along the Z axis according to a so-called sensing mode, which is excited only when the gyroscope 1 is subject to a non-zero angular speed around the direction Y, assuming that the so-called quadrature error, i.e., the undesired coupling between the driving mode and the sensing mode, is neglected.

As explained in greater detail below, the driving stage 2 generates a first and a second driving signal D1, D2, which are supplied respectively to a first and a second driving electrode 31, 32, which are shown in FIG. 3 and are part of the driving resonator stage 4; as explained in greater detail below, the first and the second driving signals D1, D2 cause the generation of electrostatic forces which act on the movable mass 20 and cause the driving mode to be excited under resonance conditions, so as to amplify the amplitude of the oscillation of the movable mass 20 along the X direction and filter any harmonics at frequencies other than the frequency $f_0$, in order to obtain that the movable mass 20 oscillates in a stable manner.

Furthermore, in use, a first and a second position sensing signals I1, I2 (e.g., they may be current signals) are generated on the sensing electrodes 5, which are indicative of the position, along the X direction, of the movable mass 20; for example, the first and the second position sensing signals I1, I2 are differential signals generated by means of a capacitive sensing mechanism.

As previously explained, when the gyroscope 1 rotates about the Y direction, the movable mass 20 also oscillates along the Z direction, due to the Coriolis force which is generated when the gyroscope 1 rotates about the Y direction. In this manner, on the sensing electrodes 7, a first and a second angular speed sensing signal S1, S2 (e.g., they may be current signals) are generated, which are indicative of the position, along the Z direction, of the movable mass 20; for example, the first and the second angular speed sensing signals S1, S2 are differential signals generated by means of a capacitive sensing mechanism.

The first conversion stage 8 receives the first and the second position sensing signals I1, I2, on the basis of which it generates a first position signal sPOS1, which is a voltage signal indicative of the position of the movable mass 20 along the X direction; in particular, as visible in FIG. 6, the first position signal sPOS1 has a sinusoidal trend and is in-phase with the position of the movable mass 20 along the X direction. Similarly, the second conversion stage 10 receives the first and the second position sensing signals S1, S2, on the basis of which it generates a second position signal sPOS2, which is a voltage signal indicative of the position of the movable mass 20 along the Z direction. For example, both the first and the second conversion stages 8, 10 may be formed by circuits of the "capacitance-to-voltage" type.

The gain control stage 14 and the PLL stage 16 receive the first position signal sPOS1.

The PLL stage 16 acts as a phase sensing and synchronization stage and includes a PLL circuit 17A and a phase-shifting stage 17B. On the basis of the first position signal sPOS1, the PLL circuit 17A generates a locked signal sLOCK (an example shown in FIG. 6), which is a square wave signal which is phase- and frequency-locked with the first position signal sPOS1, i.e., has the same phase and the same frequency as the first position signal sPOS1, therefore it has a frequency equal to the frequency $f_0$. The locked signal sLOCK is therefore in-phase with the position of the movable mass 20 along the X direction.

Furthermore, the PLL circuit 17A generates a high-frequency signal sHF (an example shown in FIG. 6), which has the shape of a square wave, has the same phase as the locked signal sLOCK and has a frequency equal to N times (with N being an integer; in FIG. 6, purely by way of example, N=16) the frequency of the locked signal sLOCK.

The phase-shifting stage 17B receives the locked signal sLOCK and the high-frequency signal sHF, on the basis of which it generates a signal sFREQ (not shown) and a phase-shifted locked signal sLOCK' (an example shown in FIG. 6).

The signal sFREQ has the same frequency as the locked signal sLOCK and is phase-shifted by 90° with respect to the locked signal sLOCK. Furthermore, the signal sFREQ is provided to the output stage 12 together with the second position signal sPOS2. On the basis of the signal sFREQ, the output stage 12 carries out a coherent-type amplitude demodulation of the second position signal sPOS2, so as to extract the so-called baseband component of the second position signal sPOS2, which has an amplitude proportional to the rotation speed of the gyroscope 1 about the Y direction.

The phase-shifted locked signal sLOCK' is equal to the locked signal sLOCK, but for a phase-shift equal to 270°. The phase-shifted locked signal sLOCK' therefore has a frequency equal to the frequency $f_0$ and is phase-shifted by 270° with respect to the first position signal sPOS1. Furthermore, the edges of the locked signal sLOCK and the phase-shifted locked signal sLOCK' are synchronous with the edges of the high-frequency signal sHF.

The timing stage 3A receives the phase-shifted locked signal sLOCK', on the basis of which it generates a first and a second control signal sA, sB and a third and a fourth control signal sAN, sBN, which are logic signals and are described herein below, but are not shown in the Figures. Optionally, the timing stage 3A may also receive the high-frequency signal sHF.

The first control signal sA is equal to the phase-shifted locked signal sLOCK', therefore it is in-phase with the first position signal sPOS1, while the second control signal sB is the logic negation of the first control signal sA. Furthermore, the third and the fourth control signals sAN, sBN are respectively equal to the logic negation of the first and the second control signals sA, sB. Consequently, the first, the second, the third and the fourth control signals sA, sB, sAN, sBN are frequency-locked with the first position signal sPOS1, i.e., they have a period equal to $1/f_0$.

As shown in FIG. 3, the bridge circuit 3B receives the first, the second, the third and the fourth control signals sA, sB, sAN, sBN, on the basis of which it generates the first and the second driving signals D1, D2.

In detail, the bridge circuit 3B includes a top reference node $N_{DD}$, which is set to a voltage $V_{rail}$, which is set by the gain control stage 14. In particular, the gain control stage 14 sets the voltage $V_{rail}$ so that it has a proportional and/or integrative and/or derivative dependence on the difference between a direct reference voltage $V_{ref}$ and the amplitude of the first position signal sPOS1.

The bridge circuit 3B also includes a first, a second, a third and a fourth switch SW1, SW2, SW3, SW4, which are respectively controlled by the first, the second, the third and the fourth control signals sA, sB, sAN, sBN, in such a way that each of these switches is closed or open, when the corresponding control signal is equal to '1' or, respectively, to '0.' Furthermore, the bridge circuit 3B includes a first and a second output node N1, N2.

The first switch SW1 is connected between the top reference node $N_{DD}$ and the first output node N1. The second switch SW2 is connected between the first output node N1 and a bottom reference node $N_{ref}$, which is set to a reference potential (e.g., equal to 0V). The third switch SW3 is connected between the top reference node $N_{DD}$ and the second output node N2. The fourth switch SW4 is connected between the second output node N2 and the bottom reference node $N_{ref}$.

In greater detail, the first and the second output nodes N1, N2 are electrically coincident with, respectively, the first and the second driving electrodes 31, 32. Furthermore, a first and a second capacitor C1 and C2 of variable type are connected between a rotor node $N_{rot}$ and, respectively, the first and the second output nodes N1, N2; in practice, the rotor node $N_{rot}$ represents the electrical equivalent of the movable mass 20, which is set to a voltage $V_{rot}$.

In use, the voltages present on the first and the second output nodes N1, N2 form the first and the second driving signals D1, D2, respectively, whose trends are shown in FIG. 4A, wherein the capacitances of the first and the second capacitors C1, C2 are assumed to be negligible.

In greater detail, the first and the second driving signals D1, D2 have a period equal to $1/f_0$. Furthermore, by indicating with $V_{D1}$ and $V_{D2}$ the instantaneous voltages of the first and, respectively, the second driving signals D1, D2, it occurs that the voltage $V_{D1}$ is equal to the voltage $V_{rail}$, when the first control signal sA (not shown in detail) is equal to '1,' and is equal to 0V, when the first control signal sA is equal to '0.' Similarly, it occurs that the voltage $V_{D2}$ is equal to the voltage $V_{rail}$, when the second control signal sB (not shown in detail) is equal to '1,' and is equal to 0V, when the second control signal sB is equal to '0.'

As shown qualitatively in FIG. 5, the first and the second driving electrodes 31, 32 are arranged in such a way that the movable mass 20 is subject to a first electrostatic force $F_{e1}$, which is proportional to $(V_{rot}-V_{D1})^2$ and is parallel and concordant with the X direction, and to a second electrostatic force $F_{e2}$, which is proportional to $(V_{rot}-V_{D2})^2$ and is parallel and opposite with respect to the X direction. The driving resonator stage 4 therefore implements an electrostatic-type actuation mechanism, such that the movable mass 20 is subject, as a whole, to an electrostatic force $F_e$ which is proportional to $(V_{rot}-V_{D1})^2-(V_{rot}-V_{D2})^2$.

The time trend of the electrostatic force acting on the movable mass 20 is of the type shown in FIG. 4B, which shows a period equal to $1/f_0$; furthermore, in FIG. 4B it has been assumed that $V_{rail}$=1V and $V_{rot}$=10V.

In practice, the driving resonator stage 4, the first conversion stage 8, the gain control stage 14 and the bridge circuit 3B form a first closed control loop, which is such that the amplitude of the oscillation of the movable mass 20 along the X direction is kept constant.

Furthermore, the driving resonator stage 4, the first conversion stage 8, the PLL stage 16, the timing stage 3A and the bridge circuit 3B form a second closed control loop, which is such that, as previously explained, the movable mass 20 oscillates along the X direction at frequency $f_0$. In fact, assuming that the driving resonator stage 4 is a linear time invariant system with one degree of freedom, and assuming to model the driving resonator stage 4 as having a force-displacement transfer function of the movable mass 20 (hereinafter referred to as the mechanical transfer function) which has a complex conjugate double pole at frequency $f_0$, at frequency $f_0$ it occurs that the movable mass 20 oscillates along the X direction with a phase-shift equal to 90° with respect to the electrostatic force applied thereto, therefore the phase-shift equal to 270° introduced by the phase-shifting stage 17B allows an overall phase-shift to be obtained, along the second closed control loop, equal to 360°.

In practice, owing to the square wave shape of the first and the second driving signals D1, D2, consumption is reduced and the movable mass 20 is driven in resonance along the X direction, however there are the following drawbacks.

Since the electrostatic force which is applied to the movable mass 20 has a square wave, rather than a sinusoidal, profile, it has non-zero spectral contributions also for multiple frequencies of the frequency $f_0$, and in particular at frequencies $3*f_0$, $5*f_0$, etc. . . . . In greater detail, referring to spurious harmonics to indicate the spectral contributions at frequencies $k*f_0$ (with k being an integer greater than one), it occurs that the spurious harmonic having maximum amplitude is the one at the frequency $3*f_0$. In particular, the amplitude of the third harmonic is approximately equal to ⅓ of the amplitude of the first harmonic.

Since the mechanical transfer function inevitably has non-idealities, which are due for example to the presence of non-linear oscillation modes or to interactions between the oscillation modes, the mechanical transfer function may include secondary peaks at frequencies other than the frequency $f_0$; furthermore, the spectral position of these peaks is strongly dependent (for example) on the temperature, the humidity and the mechanical tension to which the spring system is subject. Consequently, even assuming that the gyroscope 1 is correctly designed, it may occur that, in use, one of the peaks of the mechanical transfer function approaches frequency $3*f_0$, in which case the oscillation of the movable mass 20 acquires a spurious contribution to this frequency, which in turn entails the onset of a corresponding contribution in the second position signal sPOS2, with a resulting deterioration in the performances of gyroscope 1.

BRIEF SUMMARY

Embodiments of the present disclosure overcome, at least in part, the drawbacks of the prior art.

According to the present disclosure, there are provided a circuit and a method for driving a MEMS resonator of a gyroscope.

In one embodiment, a MEMS gyroscope includes a driving resonator stage including a first driving electrode, a second driving electrode, and a movable mass configured to oscillate according to a driving mode and having a resonance frequency. The MEMS gyroscope includes a driving circuit including a synchronization stage configured to receive an electrical position signal indicative of the position of the movable mass and to generate a reference signal phase-locked and frequency-locked with the electrical position signal. The driving circuit includes a driving stage configured to generate, based on the reference signal, a first driving signal and a second driving signal and to cause the movable mass to oscillate with a frequency equal to the resonant frequency by applying the first driving signal to the first driving electrode and by applying the second driving signal to the second driving electrode. Each of the first and the second driving signals include, for each period of the reference signal, a corresponding pulse, the pulses of the first and the second driving signals being temporally alternated and having a same duration, a ratio between the duration and the period of the reference signal being in a range [0.3-0.37] or in a range [0.63-0.7].

In one embodiment, a method is implemented for driving a driving resonator stage of a MEMS gyroscope including a first driving electrode, a second driving electrode and a movable mass configured to oscillate according to a driving mode having a corresponding resonance frequency. The method includes receiving an electrical position signal indicative of the position of the movable mass and generating a reference signal phase-locked and frequency-locked with the electrical position signal and generating, based on the reference signal, a first driving signal and a second driving signal. The method includes causing the movable mass to oscillate with a frequency equal to the resonant frequency by subjecting the movable mass to a first electrostatic force by applying the first driving signal to the first driving electrode and subjecting the movable mass to a second electrostatic force by applying the second driving signal to the second driving electrode. Each of the first and the second driving signals includes, for each period of the reference signal, a corresponding pulse, the pulses of the first and the second driving signals being temporally alternated and having a same duration, the ratio between the duration and the period of the reference signal being in the range [0.3-0.37] or in the range [0.63-0.7].

In one embodiment, a method includes generating an electrical position signal indicative of the position of a movable mass of a MEMS gyroscope, generating a reference signal that is phase-locked and frequency-locked with the electrical position signal, and generating, based on the reference signal, a first driving signal having first pulses each having a first duration. The method includes generating, based on the reference signal, a second driving signal having second pulses that do not overlap with the first pulses and each having a second duration, a sum of the first duration and the second duration being less than a period of the reference signal. The method includes causing the movable mass to oscillate at a resonant frequency of the movable mass by applying the first driving signal to a first driving electrode adjacent to the movable mass and by applying the second driving signal to a second driving electrode adjacent to the movable mass.

BRIEF DESCRIPTION OF THE SEVERAL VIEWS OF THE DRAWINGS

For a better understanding of the present disclosure, embodiments thereof are now described, purely by way of non-limiting example, with reference to the attached drawings, wherein.

DETAILED DESCRIPTION

Figure 1:
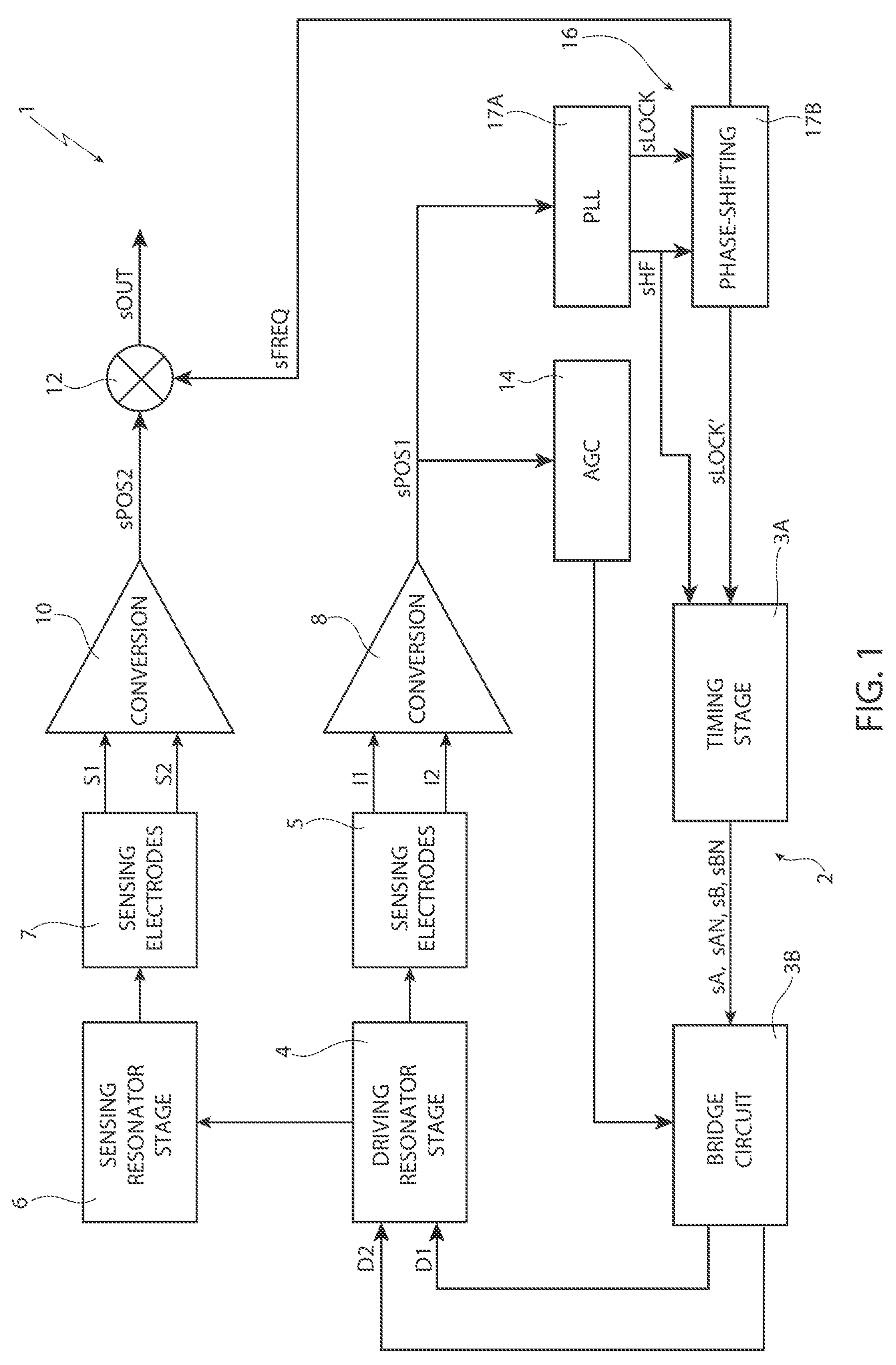
FIG. 1 shows a block diagram of a gyroscope, according to one embodiment.
Figures 2, 5:
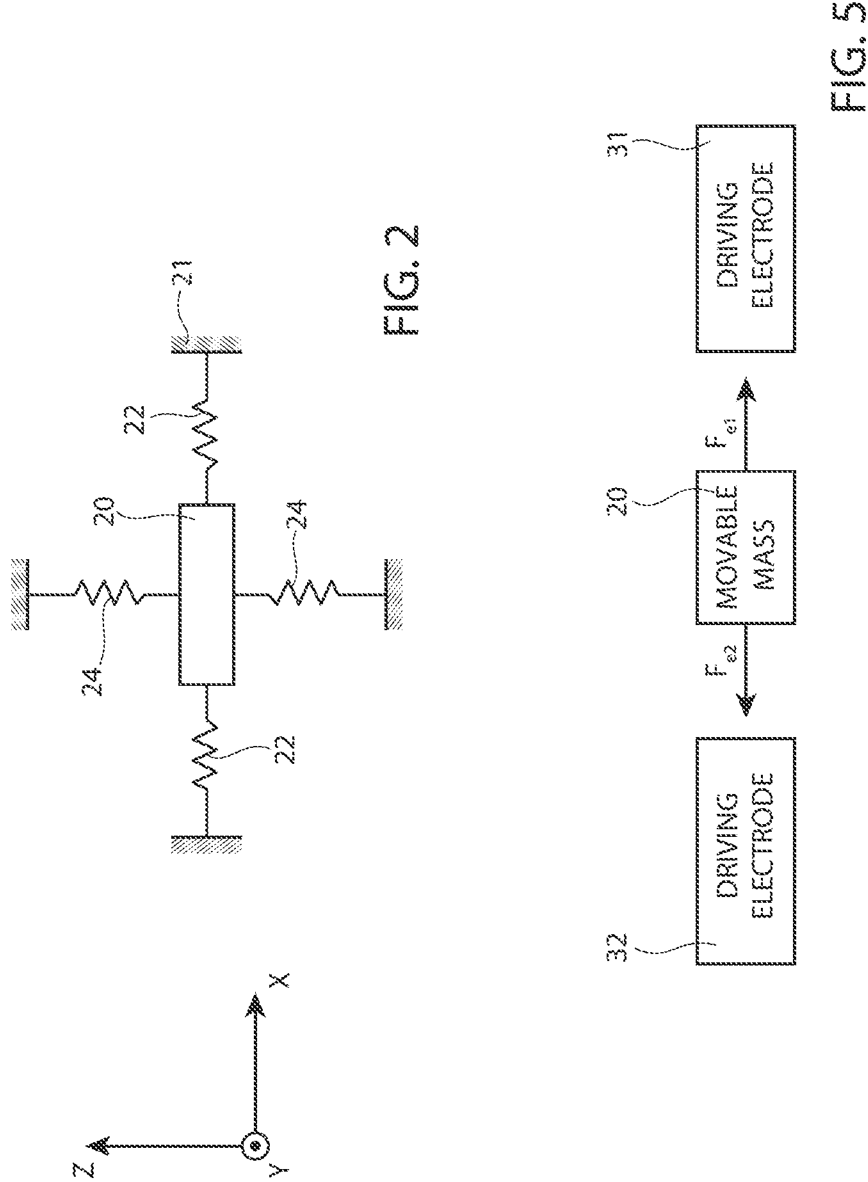
FIG. 2 schematically shows a cross-section of a MEMS system, according to one embodiment.
FIG. 5 shows a block diagram of a portion of the gyroscope shown in FIG. 1, according to one embodiment.
Figure 3:
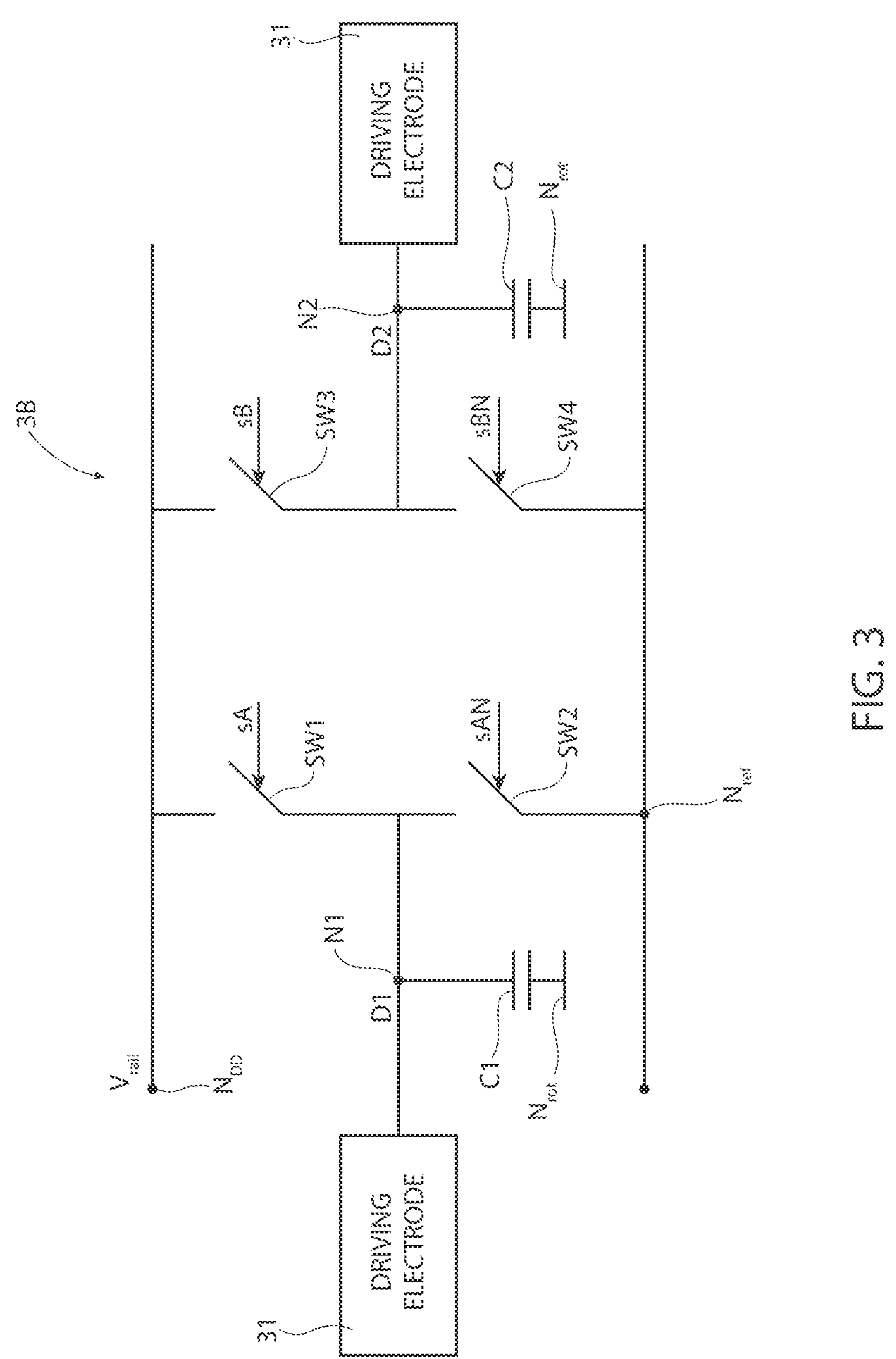
FIG. 3 shows a circuit diagram of a bridge circuit, according to one embodiment.

The present driving method is described with reference to the gyroscope 1 shown in FIG. 1; in particular, the present driving method is described with reference to the differences with respect to the functioning of the gyroscope 1.

In detail, the timing stage 3A generates the first and the second driving signals D1, D2 in the manner represented in FIG. 6, wherein there are also shown the first position signal sPOS1, the high-frequency signal sHF, the locked signal sLOCK and the phase-shifted locked signal sLOCK', already described with reference to FIG. 1. Furthermore, in FIG. 6, each period of the first position signal sPOS1 is indicated by $T_0$, where $T_0=1/f_0$; without any loss of generality, the beginning of each period $T_0$ coincides with a zero of the first position signal sPOS1, which has a positive derivative in this zero. In addition, for each period $T_0$, a corresponding set of time instants $t_1$, $t_2$, $t_3$, $t_4$, $t_5$, is indicated with $t_i = t_i + (i-1)*T_0/4$ (with i=1, 2, 3, 4, 5) and with the time instant t which coincides with the beginning of the period $T_0$, as well as with the end of the preceding period $T_0$ of the first position signal sPOS1.

This having been, as previously explained, the locked signal sLOCK is in-phase with the first position signal sPOS1; furthermore, the rising edge of the pulse of the signal sLOCK relating to each period $T_0$ occurs in the corresponding time instant $t_1$, while the falling edge of this pulse occurs in the corresponding time instant $t_3$. Consequently, as highlighted by means of an arrow in FIG. 6, the rising edge of the corresponding pulse of the phase-shifted locked signal sLOCK' occurs in the corresponding time instant $t_4$; furthermore, in the time instant $t_2$ the falling edge of the preceding pulse of the phase-shifted locked signal sLOCK' occurs.

The timing stage 3A generates the first, the second, the third and the fourth control signals sA, sB, sAN, sBN (shown in FIG. 6) on the basis of the phase-shifted locked signal sLOCK' and the high-frequency signal sHF, so that they have the same frequency as the first position signal sPOS1, therefore the frequency $f_0$, and include a pulse for each respective period. In practice, in this example, the phase-shifted locked signal sLOCK' acts as the reference signal.

Furthermore, by indicating respectively with $T_{ON}$ the duration of each pulse of the first control signal sA and indicating with $T_{ON}'$ the duration of each pulse of the second control signal sB, $T_{ON}$=T' occurs; furthermore, for reasons clarified below, in the present example $T_{ON}/T_0<0.5$ occurs.

In greater detail, and without any loss of generality, each pulse of the first control signal sA is centered on a corresponding time instant $t_1$, while each pulse of the second control signal sB is centered on a corresponding time instant $t_3$.

Furthermore, by indicating respectively with $T_{OFF}$ and $T_{OFF}'$ the duration of each pulse of the third and, respectively, the fourth control signals sAN, sBN, $T_{OFF}=T_{OFF}'$ occurs; furthermore, for reasons clarified below, referring for example to $T_{OFF}$, $T_{OFF}/T_0>0.5$ occurs.

In greater detail, and without any loss of generality, each pulse of the third control signal sAN is centered with a corresponding time instant $t_3$, while each pulse of the fourth control signal sBN is centered with a corresponding time instant $t_1$.

In even greater detail, referring for example to the first and the third control signals sA, sAN, the durations $T_{ON}$ and $T_{OFF}$ are such that the pulses of the first and the third control signals sA, sAN are temporally disjoint. In particular, between the falling edge of each pulse of the third control signal sAN and the successive rising edge of the first control signal sA a time Δ is present; furthermore, between the falling edge of each pulse of the first control signal sA and the successive rising edge of the third control signal sAN the time Δ is present. For example, the time Δ is of the order of nanoseconds and is, in any case, not greater than 0.001*T.

The durations $T_{ON}'$ and $T_{OFF}'$ are such that the pulses of the second and the fourth control signals sB, sBN are temporally disjoint. In particular, between the falling edge of each pulse of the fourth control signal sBN and the successive rising edge of the second control signal sB the time Δ is present; furthermore, between the falling edge of each pulse of the second control signal sB and the successive rising edge of the fourth control signal sBN the time Δ is present.

In practice, adjacent pulses of the first and the third control signals sA, sAN are separated from each other by the time Δ, so as to prevent the first and the second switches SW1, SW2 of the bridge circuit 3B from being closed simultaneously. Similar considerations apply to the second and the fourth control signals sB, sBN and to the third and the fourth switches SW3, SW4.

Figure 6:
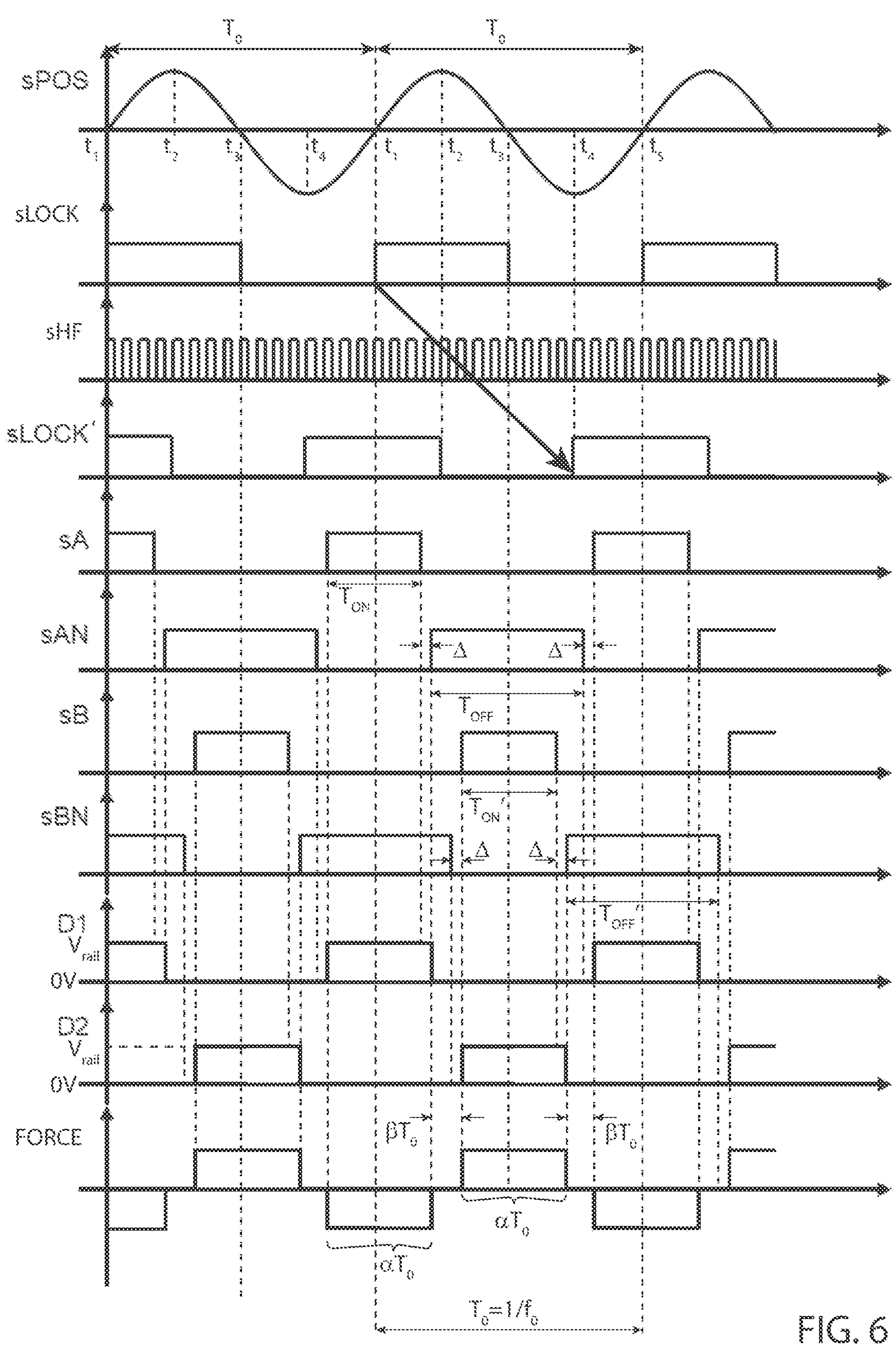
FIGS. 6 and 9 show trends over time of signals, according to one embodiment.

Again with reference to time Δ, in order to facilitate the understanding, it is shown strongly enlarged in FIG. 6. Actually, the duration of time Δ is limited to the point of being negligible even with respect to the period of the high-frequency signal sHF; for example, by indicating with $T_{HF}$ the period of the high-frequency signal sHF, $\Delta<0.1*T_{HF}$ occurs. Furthermore, as a first approximation, the edges of the first, the second, the third and the fourth control signals sA, sB, sAN, sBN may be synchronous with the edges of the high-frequency signal sHF and the durations $T_{ON}$, $T_{ON}'$, $T_{OFF}$ and $T_{OFF}'$ may be equal to integer multiples of the period $T_{HF}$.

The trends of the first and the second driving signals D1, D2 result from the trends of the first, the second, the third and the fourth control signals sA, sB, sAN, sBN. In particular, assuming again that the capacitances of the first and the second capacitors C1, C2 are negligible and assuming that, for each time Δ, each of the first and the second driving signals D1, D2 keeps the value it had at the beginning of time Δ, the first and the second driving signals D1, D2 have the trends shown in FIG. 6 and described hereinbelow. In particular, since, during each time Δ which elapses between adjacent pulses of the first and the third control signals sA, sAN, both the first and the second switches SW1, SW2 are open, the first output node N1 is in high-impedance conditions, therefore, in consideration of the short duration of time Δ, the voltage on the first output node N1 is substantially constant. Similarly, since, during each time Δ which elapses between adjacent pulses of the second and the fourth control signals sB, sBN, both the third and the fourth switches SW3, SW4 are open, the second output node N2 is in high-impedance conditions, therefore, in consideration of the short duration of time Δ, the voltage on the second output node N2 is substantially constant.

This having been said, as previously mentioned, the first driving signal D1 has a pulse for each period $T_0$. In particular, this pulse has a rising edge which temporally coincides with the rising edge of the corresponding pulse of the first control signal sA; furthermore, this pulse has a falling edge which temporally coincides with the rising edge of the successive pulse of the third control signal sAN. Consequently, each pulse of the first driving signal D1 has a duration equal to $T_{ON}+\Delta$.

The second driving signal D2 also has a pulse for each period $T_0$. In particular, this pulse has a rising edge which temporally coincides with the rising edge of the corresponding pulse of the third control signal sB; furthermore, this pulse has a falling edge which temporally coincides with the rising edge of the successive pulse of the fourth control signal sAN. Consequently, each pulse of the second driving signal D2 has a duration equal to $T_{ON}'+\Delta$.

As previously explained, during each respective pulse, both the first and the second driving signals D1, D2 assume the voltage $V_{rail}$, which may be for example equal to 1V; furthermore, apart from the respective pulses, each of the first and the second driving signals D1, D2 is equal to 0V.

In practice, the pulses of the first and the second driving signals D1, D2 form a succession of pulses; furthermore, the first and the second driving signals D1, D2 are phase-shifted by 180°.

Since the electrostatic force is proportional to $(V_{rot}-V_{D1})^2-(V_{rot}-V_{D2})^2$, with $V_{rot}$ for example equal to 10V, as a result the electrostatic force has the shape shown again in FIG. 6.

In detail, the electrostatic force $F_e$ has, over time, a succession of pulses having respectively a first and a second polarity, alternating and temporally separated from each other.

In particular, for each pulse of the first driving signal D1, the electrostatic force $F_e$ has a corresponding pulse having the first (negative) polarity; furthermore, each pulse of the first driving signal D1 is temporally superimposed on the corresponding pulse with the first polarity of the electrostatic force $F_e$. In addition, for each pulse of the second driving signal D2, the electrostatic force $F_e$ has a corresponding pulse having the second (positive) polarity; furthermore, each pulse of the second driving signal D2 is temporally superimposed on the corresponding pulse with the second polarity of the electrostatic force $F_e$.

In greater detail, each pulse of the electrostatic force $F_e$ having the first polarity has a duration equal to $T_{ON}+\Delta$; furthermore, each pulse of the electrostatic force $F_e$ having the second polarity has a duration equal to $T_{ON}'+\Delta$, with $T_{ON}=T_{ON}'$, as previously explained. Consequently, regardless of the polarity, the pulses of the electrostatic force $F_e$ have a same duration.

In even greater detail, it is possible to express the duration of each pulse of the first or the second driving signal D1, D2, and therefore also the duration of each pulse of the electrostatic force $F_e$, as $\alpha*T_0$. Furthermore, adjacent pulses of the succession of pulses formed by the pulses of the first and the second driving signals D1, D2 are temporally separated by a time distance equal to $\beta*T_0$ (with $\beta=0.5-\alpha$); consequently adjacent pulses of different polarity of the electrostatic force $F_e$ are temporally spaced from each other by a time equal to $\beta*T_0$. Furthermore, assuming that time $\Delta$ is neglected, the duration of each pulse of the first or the second driving signal D1, D2, and therefore also the duration of each pulse of the electrostatic force $F_e$, is equal to a multiple integer of the period $T_{HF}$ of the high-frequency signal sHF.

This having been said, the Applicant has observed how, by suitably selecting the value of $\alpha$, and consequently also the value of $\beta$, the spectral content of the third harmonic of the electrostatic force $F_e$ may be reduced, without excessively reducing the spectral content of the first harmonic, with consequent advantages on the stability of the resonant oscillation of the movable mass 20 and, therefore, on the performances of the gyroscope.

Figure 7:
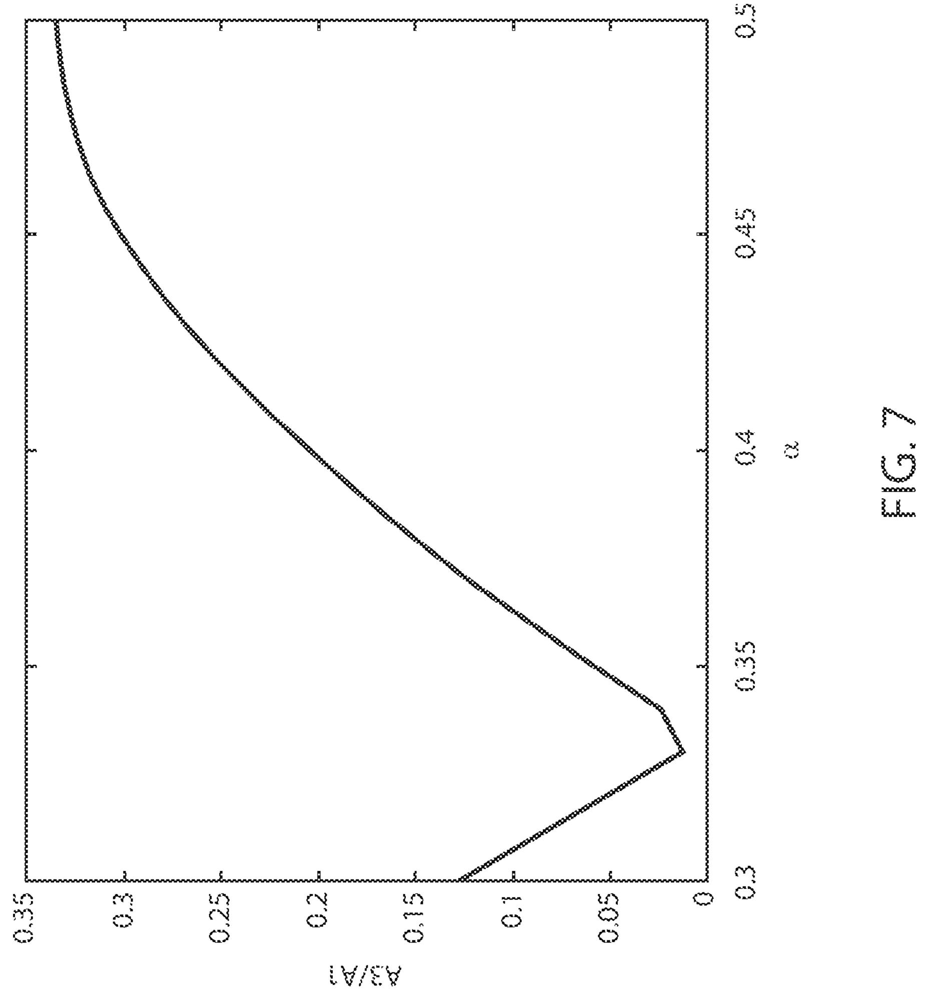
FIGS. 7 and 8 show a trend of a ratio between spectral amplitudes as the value of a parameter varies, according to one embodiment.

In particular, the Applicant has found how, by indicating the amplitudes of the first and the third harmonics respectively with A1 and A3, the trend of the ratio A3/A1 as $\alpha$ varies has the trend shown in FIG. 7.

Furthermore, the Applicant has observed how it is possible to optimize the trade-off between the reduction of the amplitude of the third harmonic and the reduction of the amplitude of the first harmonic by setting $0.3\leq\alpha\leq0.37$ (e.g., $0.32\leq\alpha\leq0.34$).

Figure 4B:
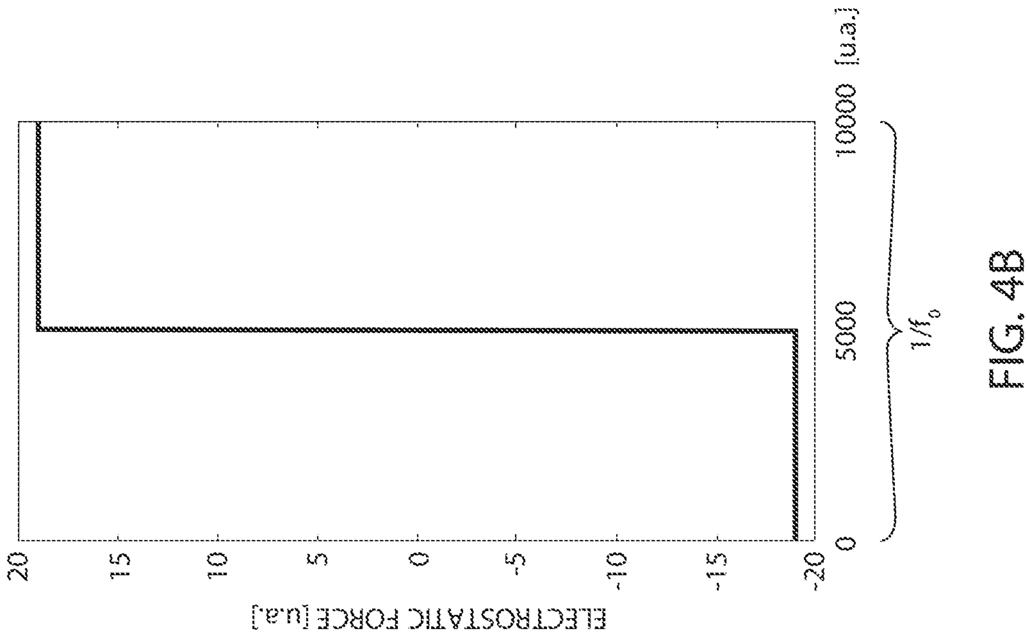
FIG. 4B shows trends over time of an electrostatic force which depends on the signals shown in FIG. 4A, according to one embodiment.
Figure 4A:
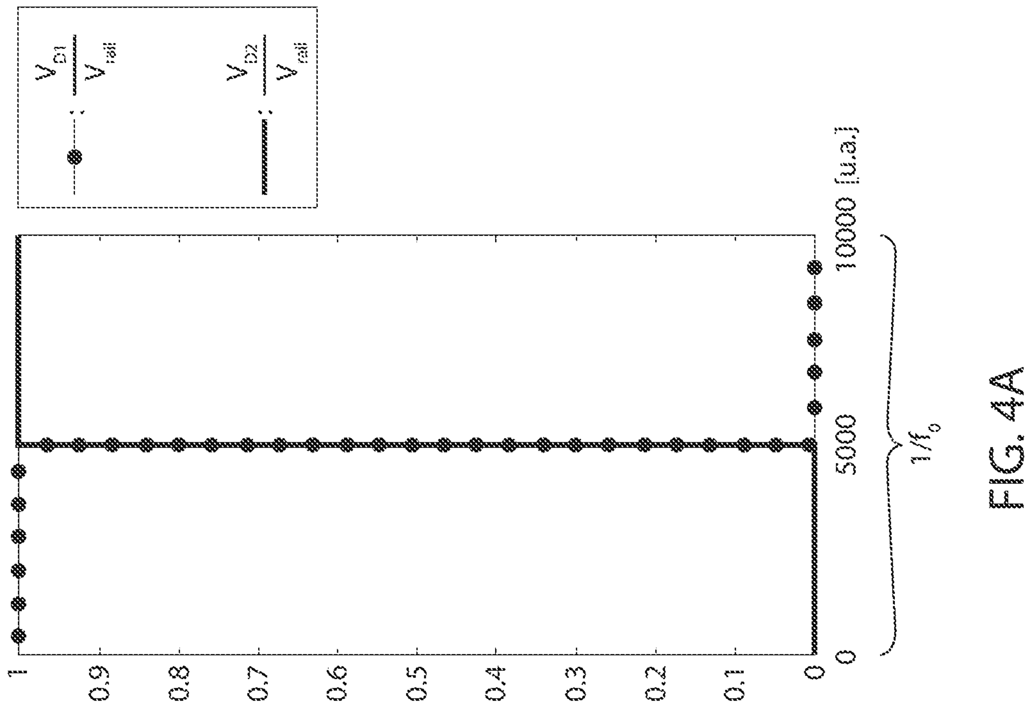
FIG. 4A shows trends over time of signals generated in the gyroscope shown in FIG. 1, according to one embodiment.

For example, the Applicant has observed that, if $\alpha=0.33$, the amplitude of the third harmonic is equal to approximately one hundredth of the amplitude of the first harmonic, with a reduction of 15% of the amplitude of the first harmonic with respect to what is obtained by adopting the waveforms shown in FIGS. 4A and 4B.

In practice, the value of $\alpha$, and consequently also the value of $\beta$, may be set by neglecting time $\Delta$ and observing that the period $T_0$ is formed by an integer number (hereinafter referred to as number $NUM=T_0/T_{HF}$) of periods $T_{HF}$ of the high-frequency signal sHF. This having been said, in order to obtain a desired value of $\alpha$, the timing stage 3A may be configured in such a way that $T_{ON}=T_{ON}'=\alpha*NUM*T_{HF}$ occurs; in this case, adjacent pulses of different polarity of the electrostatic force $F_e$ are temporally spaced from each other by a time equal to $\beta*NUM*T_{HF}$. For example, assuming that the high-frequency signal sHF has a frequency equal to 10000 times the frequency $f_0$, and therefore NUM=10000, and assuming that it is desired to obtain $\alpha=0.33$, $T_{ON}=T_{ON}'=\alpha*NUM*T_{HF}=3300*T_{HF}$ may be set.

The advantages that the present solution affords are clear from the previous description.

In particular, the present solution allows to reduce the amplitude of the third harmonic (and, more generally, of the multiple harmonics), and therefore the negative impact that the non-idealities of the driving resonator stage may have on the performances of the gyroscope, without increasing the circuit complexity of the gyroscope.

Furthermore, the present solution may be implemented in a first semiconductive die (not shown), which includes the first and the second conversion stages 8, 10, the output stage 12, the gain control stage 14, the PLL stage 16, the timing stage 3A and the bridge circuit 3B. The driving resonator stage 4, the sensing resonator stage 6 and the sensing electrodes 5, 7 may be formed in a second semiconductive die (not shown).

Finally, it is clear that modifications and variations may be made to the driving circuit and method described and illustrated herein, without thereby departing from the protective scope of the present disclosure, as defined in the attached claims.

For example, what has been described also applies in case the movable mass 20 is coupled to the frame 21 through a spring system different from what has been described, and in particular through a set of masses and stiffnesses comparable, as regards the driving movement, to a system with one degree of freedom. Similarly, the previous description also applies in case the gyroscope includes more than one movable mass.

For example, the driving resonator stage may include a first movable mass and a second movable mass (not shown) elastically coupled to each other, as well as to the frame. In this case, the driving mode that provides for the first and the second movable masses to oscillate in phase-opposition along the X direction is excited; the frequency $f_0$ therefore represents the resonance frequency of this mode. Furthermore, the first and the second driving signals D1, D2 may be provided respectively to a number of first electrodes (not shown), which are capacitively coupled to the first movable mass, and to a number of second electrodes (not shown), which are operatively coupled to the second movable mass. Furthermore, it occurs that, when the gyroscope is subject to a rotation about the Y direction, the first and the second movable masses are subject to Coriolis forces that are approximately equal in modulus (assuming that the first and the second movable masses have a same mass), are directed parallel to the Z direction and have opposite directions.

Embodiments are also possible wherein time $\Delta$ is zero. Furthermore, the management of the voltage values of the first and the second driving signals D1, D2 during times $\Delta$ may be different from what has been described. For example, the bridge circuit 3B may include sub-circuits which allow the voltages on the first and the second output nodes N1, N2 to be kept constant during time Δ.

Figure 8:
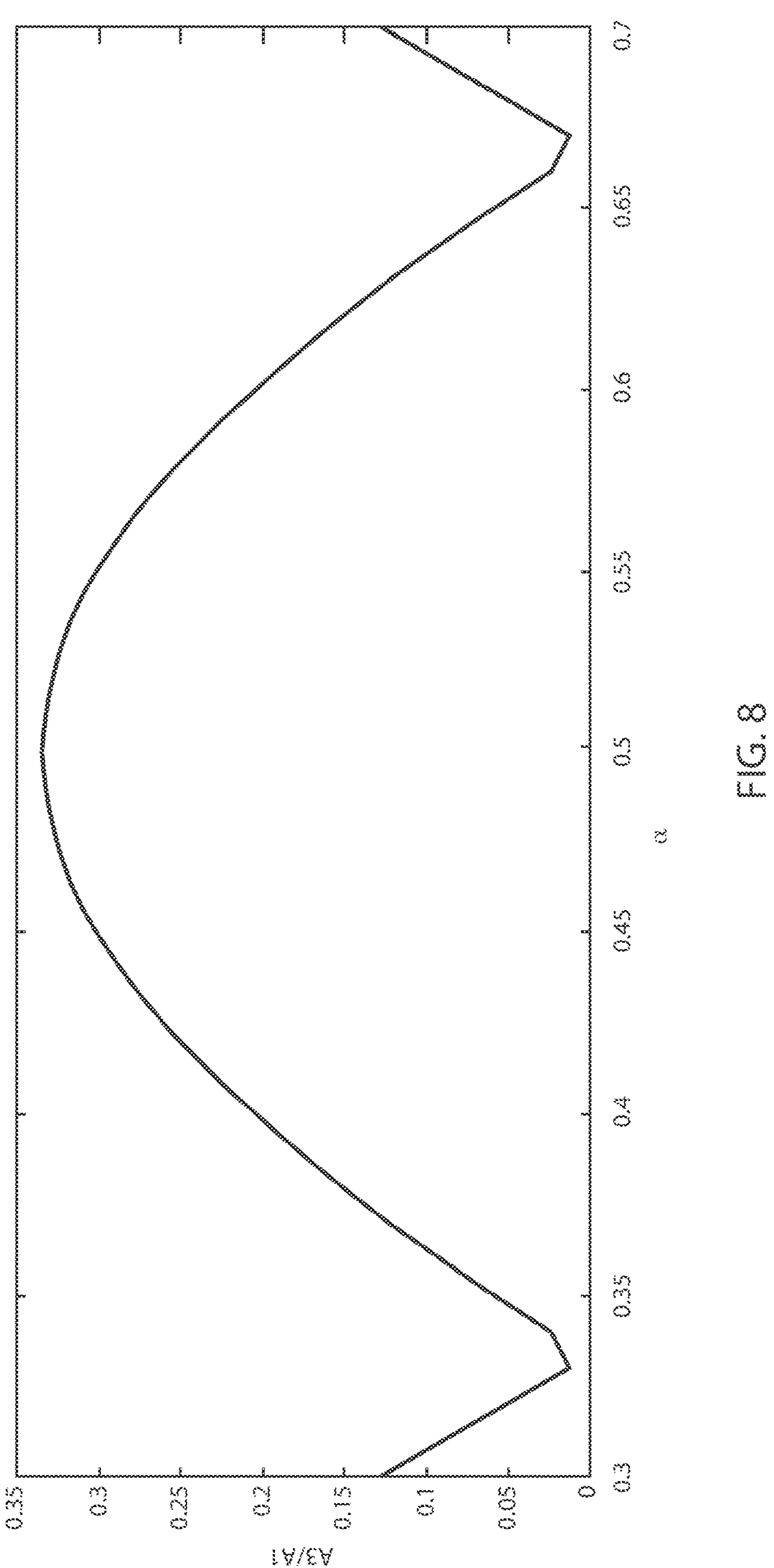

Finally, the previously described advantages may also be obtained in case, again by indicating with $\alpha*T_0$ the duration of each pulse of the first or the second driving signal D1, D2, the relationship $0.63 \le \alpha \le 0.7$ (e.g., $0.66 \le \alpha \le 0.68$) applies, as shown by the trend of the ratio A3/A1 as α varies, shown in FIG. 8.

Figure 9:
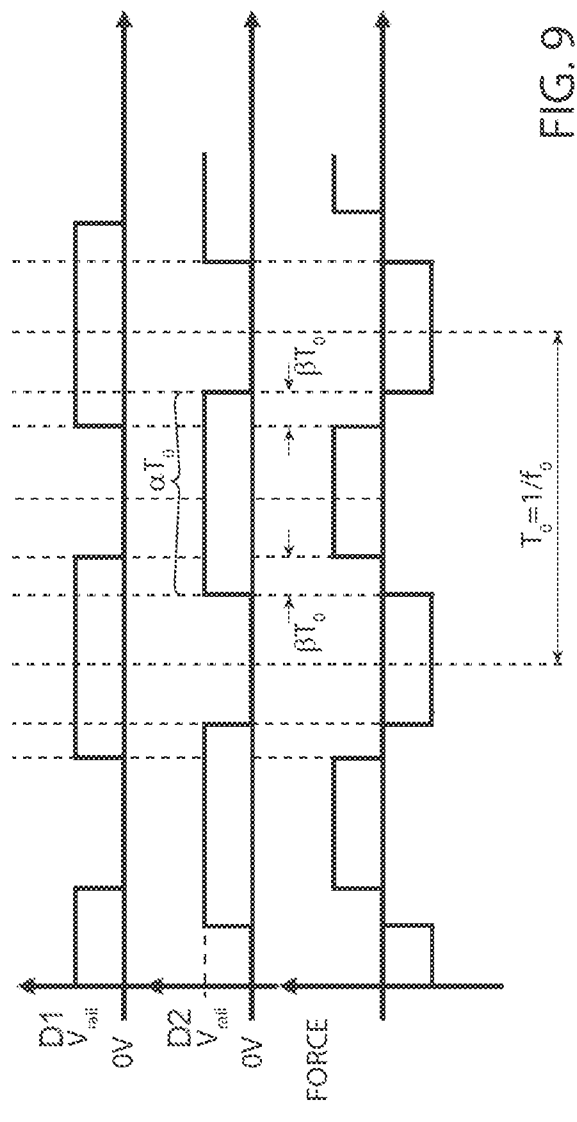

In greater detail, in the time instants wherein the voltages $V_{D1}$ and $V_{D2}$ of the first and the second driving signals D1, D2 are equal to each other, the first and the second electrostatic forces $F_{e1}$, $F_{e2}$ cancel each other out; consequently, as shown in FIG. 9, the trend of the electrostatic force acting on the movable mass 20 is the same as shown in FIG. 6.

In particular, in this case the duration of each pulse of the electrostatic force $F_e$ is equal to $(1-\alpha)*T_0$; furthermore, adjacent pulses of the succession of pulses formed by the pulses of the first and the second driving signals D1, D2 are temporally superimposed for a time equal to $\beta*T_0$ (with $\beta=\alpha-0.5$). Although not shown, in this case the relationships $T_{ON}=T_{ON}'>0.5*T_0$ and $T_{OFF}=T_{OFF}'<0.5*T_0$ also apply.

A driving circuit for a driving resonator stage (4) of a MEMS gyroscope (1) including at least a first and a second driving electrode (31,32) and at least one movable mass (20) configured to oscillate according to a driving mode having a corresponding resonance frequency ($f_0$), the driving circuit (3A,3B) may be summarized as including a synchronization stage (16) configured to receive an electrical position signal (sPOS1) indicative of the position of the movable mass (20) and to generate a reference signal (sLOCK') phase- and frequency-locked with the electrical position signal (sPOS1); a driving stage (2) configured to generate, on the basis of the reference signal (sLOCK'), a first and a second driving signal (D1,D2) and to couple to the driving resonator stage (4) so as to apply the first and the second driving signals (D1,D2) to the first and, respectively, the second driving electrodes (31,32), so that the movable mass (20) is subject to a first and a second electrostatic force, which are a function of the first and the second driving signals (D1, D2), respectively, and cause the movable mass to oscillate with a frequency equal to the resonance frequency ($f_0$); and wherein each of the first and the second driving signals (D1,D2) includes, for each period of the reference signal (sLOCK'), a corresponding pulse, the pulses of the first and the second driving signals (D1,D2) being temporally alternated and having a same duration ($\alpha*T_0$), the ratio (α) between the duration and the period ($T_0$) of the reference signal (sLOCK') being included in the range [0.3-0.37] or in the range [0.63-0.7].

the the ratio (α) between the duration and the period ($T_0$) of the reference signal (sLOCK') may be in the range [0.32-0.34] or in the range [0.66-0.68].

The first and the second driving signals (D1,D2) may be phase-shifted by 180°.

The pulses of the first and the second driving signals (D1,D2) may form a succession of pulses; and adjacent pulses of the succession may be temporally separated by a same time distance ($\beta*T_0$) or may be temporally superimposed for a same time ($\beta*T_0$).

The ratio (β) between the time distance ($\beta*T_0$) and the period ($T_0$) of the reference signal (sLOCK') may be equal to $0.5-\alpha$, wherein α indicates the ratio between the duration ($\alpha*T_0$) of the pulses of the first and the second driving signals (D1,D2) and the period ($T_0$) of the reference signal (sLOCK'); and the ratio (β) between the same time ($\beta*T_0$) and the period ($T_0$) of the reference signal (sLOCK') may be equal to $\alpha-0.5$.

During each respective pulse, the first and the second driving signals (D1,D2) may have a same value ($V_{rail}$); the driving circuit (2,14,16) may further include a gain control circuit (14) configured to receive the electrical position signal (sPOS1) and to control the driving stage (2) so that the value ($V_{rail}$) of the first and the second driving signals (D1,D2) may be such that the amplitude of the oscillation of the movable mass (20) is constant.

A MEMS gyroscope may be summarized as including the driving circuit (2,16) and the driving resonator stage (4).

The reference signal (sLOCK') may be phase-shifted by 270° with respect to the electrical position signal (sPOS1); and the driving resonator stage (4) may be configured in such a way that, at the resonance frequency ($f_0$), the oscillation of the movable mass (20) is phase-shifted by 90° with respect to an electrostatic force equal to the sum of the first and the second electrostatic forces.

A method for driving a driving resonator stage (4) of a MEMS gyroscope (1) including at least a first and a second driving electrodes (31,32) and at least one movable mass (20) configured to oscillate according to a driving mode having a corresponding resonance frequency ($f_0$), the driving method may be summarized as including receiving an electrical position signal (sPOS1) indicative of the position of the movable mass (20) and generating a reference signal (sLOCK') phase- and frequency-locked with the electrical position signal (sPOS1); generating, on the basis of the reference signal (sLOCK'), a first and a second driving signal (D1,D2) and applying the first and the second driving signals (D1,D2) to the first and, respectively, the second driving electrodes (31,32), so that the movable mass (20) is subject to a first and a second electrostatic force, which are a function of the first and the second driving signals (D1, D2), respectively, and cause the movable mass to oscillate with a frequency equal to the resonance frequency ($f_0$); and wherein each of the first and the second driving signals (D1,D2) includes, for each period of the reference signal (sLOCK'), a corresponding pulse, the pulses of the first and the second driving signals (D1,D2) being temporally alternated and having a same duration ($\alpha*T_0$), the ratio (α) between the duration and the period ($T_0$) of the reference signal (sLOCK') being included in the range [0.3-0.37] or in the range [0.63-0.7].

The ratio (α) between the duration and the period ($T_0$) of the reference signal (sLOCK') may be in the range [0.32-0.34] or in the range [0.66-0.68].

The first and the second driving signals (D1,D2) may be phase-shifted by 180°.

The pulses of the first and the second driving signals (D1,D2) may form a succession of pulses; and adjacent pulses of the succession may be temporally separated by a same time distance ($\beta*T_0$) or are temporally superimposed for a same time ($\beta*T_0$).

The ratio (β) between the time distance ($\beta*T_0$) and the period ($T_0$) of the reference signal (sLOCK') may be equal to $0.5-\alpha$, wherein α indicates the ratio between the duration ($\alpha*T_0$) of the pulses of the first and the second driving signals (D1,D2) and the period ($T_0$) of the reference signal (sLOCK'); and the ratio (β) between the same time ($\beta*T_0$) and the period ($T_0$) of the reference signal (sLOCK') may be equal to $\alpha-0.5$.

During each respective pulse, the first and the second driving signals (D1,D2) have a same value ($V_{rail}$); the driving method (2,14,16) may further include receiving the electrical position signal (sPOS1) and controlling the driving stage (2) so that the value ($V_{rail}$) of the first and the second driving signals (D1,D2) may be such that the amplitude of the oscillation of the movable mass (20) is constant.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A MEMS gyroscope, comprising:

a driving resonator stage including a first driving electrode, a second driving electrode, and a movable mass configured to oscillate according to a driving mode and having a resonance frequency;

a driving circuit including:

a synchronization stage configured to receive an electrical position signal indicative of the position of the movable mass and to generate a reference signal phase-locked and frequency-locked with the electrical position signal;

a driving stage configured to generate, based on the reference signal, a first driving signal and a second driving signal and to cause the movable mass to oscillate with a frequency equal to the resonant frequency by applying the first driving signal to the first driving electrode and by applying the second driving signal to the second driving electrode;

wherein each of the first and the second driving signals include, for each period of the reference signal, a corresponding pulse, the pulses of the first and the second driving signals being temporally alternated and having a same duration, a ratio between the duration and the period of the reference signal being in a range [0.3-0.37] or in a range [0.63-0.7].

2. The MEMS gyroscope according to claim 1, wherein the ratio between the duration and the period of the reference signal is in a range [0.32-0.34] or in a range [0.66-0.68].

3. The MEMS gyroscope according to claim 1, wherein the first and the second driving signals are phase-shifted by 180°.

4. The MEMS gyroscope according to claim 1, wherein the pulses of the first and the second driving signals form a succession of pulses; and wherein adjacent pulses of the succession are temporally separated by a same time distance or are temporally superimposed for a same time.

5. The MEMS gyroscope according to claim 4, wherein the ratio between the time distance and the period of the reference signal is equal to $0.5-\alpha$, wherein $\alpha$ indicates the ratio between the duration of the pulses of the first and the second driving signals and the period of the reference signal; and wherein the ratio between the same time and the period of the reference signal is equal to $\alpha-0.5$.

6. The MEMS gyroscope according to claim 1, wherein, during each respective pulse, the first and the second driving signals have a same value; the driving circuit further including a gain control circuit configured to receive the electrical position signal and to control the driving stage so that the value of the first and the second driving signals is such that the amplitude of the oscillation of the movable mass is constant.

7. The MEMS gyroscope of claim 1, wherein the driving stage is configured to subject the movable mass to a first electrostatic force by applying the first driving signal to the first driving electrode and to subject the movable mass to a second electrostatic force by applying the second driving signal to the second driving electrode.

8. The MEMS gyroscope according to claim 7, wherein the reference signal is phase-shifted by 270° with respect to the electrical position signal; and wherein the driving resonator stage is configured in such a way that, at the resonance frequency, the oscillation of the movable mass is phase-shifted by 90° with respect to an electrostatic force equal to a sum of the first and the second electrostatic forces.

9. A method for driving a driving resonator stage of a MEMS gyroscope including a first driving electrode, a second driving electrode and a movable mass configured to oscillate according to a driving mode having a corresponding resonance frequency, the method comprising:

receiving an electrical position signal indicative of the position of the movable mass and generating a reference signal phase-locked and frequency-locked with the electrical position signal;

generating, based on the reference signal, a first driving signal and a second driving signal;

causing the movable mass to oscillate with a frequency equal to the resonant frequency by:

subjecting the movable mass to a first electrostatic force by applying the first driving signal to the first driving electrode; and subjecting the movable mass to a second electrostatic force by applying the second driving signal to the second driving electrode;

wherein each of the first and the second driving signals includes, for each period of the reference signal, a corresponding pulse, the pulses of the first and the second driving signals being temporally alternated and having a same duration, the ratio between the duration and the period of the reference signal being in the range [0.3-0.37] or in the range [0.63-0.7].

10. The driving method according to claim 9, wherein the ratio between the duration and the period of the reference signal is in the range [0.32-0.34] or in the range [0.66-0.68].

11. The driving method according to claim 9, wherein the first and the second driving signals are phase-shifted by 180°.

12. The driving method according to claim 9, wherein the pulses of the first and the second driving signals form a succession of pulses; and wherein adjacent pulses of the succession are temporally separated by a same time distance or are temporally superimposed for a same time.

13. The driving method according to claim 12, wherein the ratio between the time distance and the period of the reference signal is equal to $0.5-\alpha$, wherein $\alpha$ indicates the ratio between the duration of the pulses of the first and the second driving signals and the period of the reference signal; and wherein the ratio between the same time and the period of the reference signal is equal to $\alpha-0.5$.

14. The driving method according to claim 9, wherein, during each respective pulse, the first and the second driving signals have a same value; the driving method further comprising receiving the electrical position signal and controlling the driving stage so that the value of the first and the second driving signals is such that the amplitude of the oscillation of the movable mass is constant.

15. A method, comprising:

generating an electrical position signal indicative of the position of a movable mass of a MEMS gyroscope;

generating a reference signal that is phase-locked and frequency-locked with the electrical position signal;

generating, based on the reference signal, a first driving signal having first pulses each having a first duration;

generating, based on the reference signal, a second driving signal having second pulses that do not overlap with the first pulses and each having a second duration, a sum of the first duration and the second duration being less than a period of the reference signal;

causing the movable mass to oscillate at a resonant frequency of the movable mass by applying the first driving signal to a first driving electrode adjacent to the movable mass and by applying the second driving signal to a second driving electrode adjacent to the movable mass.

16. The method of claim 15, wherein:

applying the first driving signal to the first driving electrode subjects the movable mass to a first electrostatic force; and applying the second driving signal to the second driving electrode subjects the movable mass to a second electrostatic force.

17. The method of claim 16, wherein at the resonance frequency, the oscillation of the movable mass is phase-shifted by 90° with respect to an electrostatic force equal to a sum of the first and the second electrostatic forces.

18. The method of claim 15, wherein the first duration is equal to the second duration, wherein a ratio of the first duration and the period of the reference signal is in a range [0.3-0.37] or in a range [0.63-0.7].

19. The method of claim 18, wherein the ratio is in a range [0.32-0.34] or in a range [0.66-0.68].

20. The method of claim 16 wherein a value of the first and the second driving signals is such that an amplitude of the oscillation of the movable mass is constant.

* * * * *